Aug. 10, 1926.

W. D. BUFFINGTON

HOE

Filed May 27, 1925

1,595,821

Inventor
W. D. Buffington
By
Clarence O'Brien
Attorney

Patented Aug. 10, 1926.

1,595,821

UNITED STATES PATENT OFFICE.

WESLEY DAVID BUFFINGTON, OF RICHMOND, CALIFORNIA, ASSIGNOR OF ONE-THIRD TO JAMES HERZOG, OF RICHMOND, CALIFORNIA.

HOE.

Application filed May 27, 1925. Serial No. 33,205.

This invention relates to improvements in agricultural implements, and is more particularly adapted to an improved hoe.

One of the important objects of the present invention is to provide a hoe which includes a means for thinning small plants, and further breaking up clods of dirt close to the plants.

A further object of the invention is to provide a hoe of the above mentioned character which is simple in construction, inexpensive, strong and durable and further well adapted to the purpose for which it is designed.

Other objects and advantages of this invention will become apparent during the course of the following description.

In the accompanying drawing forming a part of this specification and in which like numerals designate like parts throughout the same:

Figure 1:
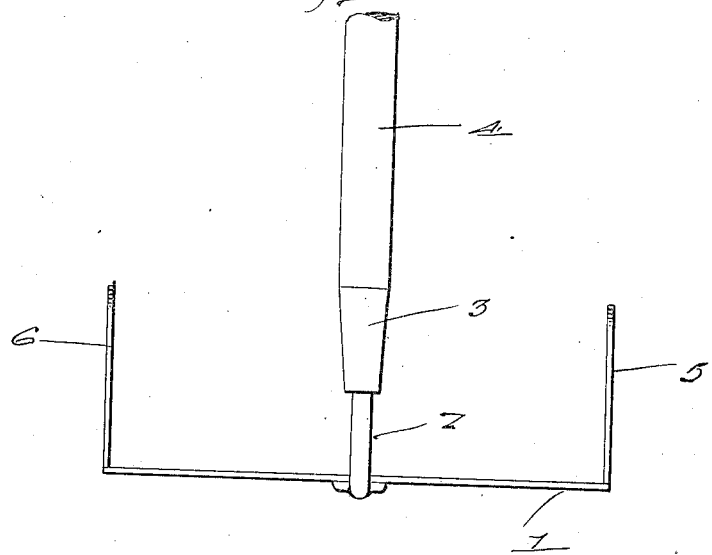
Figure 1 is a top plan view of my improved hoe.

In the drawing, wherein for the purpose of illustration is shown the preferred embodiment of my invention, the numeral 1 designates the blade of the hoe, the same having its bottom edge sharpened. The usual goose neck 2 is associated with the upper portion of the hoe blade 1, and is provided with the socket 3 for receiving the handle 4.

Figure 2:
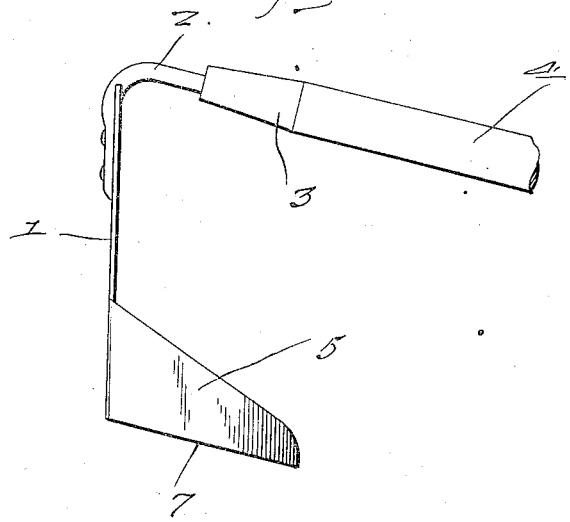
Figure 2 is a side elevation thereof.

Extending rearwardly from the side edges of the blade 1 adjacent the bottom edge thereof are the auxiliary blades 5 and 6 respectively. Each of the auxiliary blades tapers gradually toward its rear end, and the auxiliary blades are further disposed at substantially right angles to the blade 1. The auxiliary blades 5 and 6 are inclined downwardly so that the cutting edges 7 thereof will be disposed parallel with respect to the handle 4. This is clearly illustrated in Figure 2 of the drawing, and the purpose thereof will be presently hereinafter more fully described.

In use, the auxiliary blades will be disposed between the plant and by drawing the hoe rearwardly, the sharpened bottom edges 7 of the auxiliary blade will break the crust or clods of dirt which forms on top of the soil adjacent the plant, and furthermore the small plants will be thinned without any injury being caused to the plants by the hoe. The auxiliary blades will further cut down the weeds or grass near the plants.

In using a hoe, the handle is ordinarily disposed at an angle of about approximately thirty degrees, and therefore it is necessary that the cutting edges of the auxiliary blades be disposed downwardly so as to enable the same to properly function when the hoe is in use.

While I have shown the preferred embodiment of my invention it is to be understood that minor changes may be resorted to without departing from the spirit of the invention and the scope of the appended claim.

Having thus described the invention, what I claim as new and desire to secure by Letters Patent is:—

In a hoe, a main blade, a handle therefor, a pair of auxiliary blades extending rearwardly from the side edges of the main blade adjacent the bottom edge thereof, and at right angles to the main blade, said auxiliary blades tapering gradually toward their rear ends, the edges of the auxiliary blades being inclined downwardly with respect to the main blade.

In testimony whereof I affix my signature.

WESLEY DAVID BUFFINGTON.